United States Patent
Graaf et al.

(10) Patent No.: US 8,524,387 B2
(45) Date of Patent: Sep. 3, 2013

(54) BATTERY UNIT FOR HYBRID OR ELECTRIC VEHICLES

(75) Inventors: Marc Graaf, Krefeld (DE); Stephan Köster, Langerwehe (DE); Florian Wieschollek, Hürth (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 392 days.

(21) Appl. No.: 12/829,307

(22) Filed: Jul. 1, 2010

(65) Prior Publication Data

US 2011/0003187 A1    Jan. 6, 2011

(51) Int. Cl.
*H01M 10/50* (2006.01)

(52) U.S. Cl.
USPC .......................................................... 429/120

(58) Field of Classification Search
USPC .......................................... 429/120, 162, 158
See application file for complete search history.

(56) References Cited

U.S. PATENT DOCUMENTS

| | | | |
|---|---|---|---|
| 5,419,982 A * | 5/1995 | Tura et al. ...................... 429/162 |
| 6,858,344 B2 | 2/2005 | Marukawa et al. | |
| 2005/0170240 A1 | 8/2005 | German et al. | |

FOREIGN PATENT DOCUMENTS

| | | |
|---|---|---|
| DE | 102006010063 A1 | 9/2007 |
| DE | 102007063176 A1 | 9/2008 |
| DE | 102008016936 A1 | 10/2008 |

\* cited by examiner

*Primary Examiner* — Carlos Barcena
(74) *Attorney, Agent, or Firm* — Dickinson Wright PLLC (57) ABSTRACT

A battery unit for hybrid or electric vehicles comprising a cell module including a plurality of storage cells, each accommodated in a prismatic cell casing with two large surfaces arranged parallel to each other and four narrow side surfaces. The prismatic cell casings with their parallel arranged large surfaces are stacked adjacent to each other. One of the narrow side surfaces, the cell casing bottom of each storage cell. A cooling device comprising a plate-shaped cooling body with one or several recesses, and one or several fastening mechanisms integrated into the cell module bottom that agree with a corresponding number of recesses of the cooling body, are configured to couple the cooling body to the cell module.

10 Claims, 11 Drawing Sheets

BATTERY UNIT FOR HYBRID OR ELECTRIC VEHICLES

BACKGROUND OF THE INVENTION

1. Technical Field

The invention relates to a battery unit for hybrid or electric vehicles, comprising a cell module and a cooling device.

2. Discussion

Modern hybrid or electric vehicles use accumulators for storing electric energy. Such accumulators usually comprise a battery of single cells placed in a common casing. During charging and discharging of such accumulators heat losses arise within the single storage cells. It is important for the capacity and life of the storage cells that the lost heat is removed from the storage cells such that the battery is operated within the limits of a defined temperature range. In addition, the temperature spread must not become too wide, over the single cell and over the whole battery as well.

Natural heat dissipation through convection or radiation to the environment cannot meet the requirement of homogeneity due to the high cell density within the battery and the enclosing casing. Furthermore, certain maximum operating temperatures of the cells must not be exceeded over longer periods of time. During warm weather, therefore, it may be necessary to dissipate the heat to maintain a temperature level below the ambient temperature. In order to meet the requirements the storage cells impose upon the temperature level and distribution, electric accumulators for hybrid or electric vehicles require active cooling devices. While some prior art already offers cooling bodies as an integral component of a storage battery unit, some issues still exist.

Storage cells are increasingly being developed that geometrically do not correspond to the conventional cylindrical design but instead utilize a prismatic design. Prismatic cells, due to the stack-like arrangement of the cells, enable utilization of the space in the battery casing more efficiently than cylindrical cells. On the other hand, prismatic cells frequently require strong pressure against two of the large surfaces in the direction parallel to thickness. An appropriate clamping device per module to provide appropriate pressure to a combination of at least two cells to build a unit, or of whole batteries, can collide with the space for installing the cooling device, and hence must be considered during design. While these specifics do not make it impossible to adapt cooling devices known as being suitable for cylindrical cells, often the specific advantage of a volume efficient cell arrangement offered by prismatic cells cannot be utilized due to the required cooling.

From DE 10 2004 005 393 A1 (U.S. Publication No. 2005/0170240), an electrochemical energy store is known that is equipped with heat exchanger units and several electrochemical storage cells located between the heat exchanger units. This energy store is based on the principle of a plate heat exchanger. Layers of storage cells and cooled plate elements are alternatingly displaced in a stack. Here, the plate elements that are passed by a coolant consist of several parallel displaced flat tubes that are deformed to form waves corresponding to the cylindrical contour of the cells. FIG. 12 of DE 10 2004 005 393 A1 (U.S. Publication No. 2005/0170240) shows a stack of two cooling plates and two planes of cylindrical storage cells. The heat of the cells is dissipated over almost the total shell surface.

DE 10 2006 010 063 A1 proposes a socket mount for several cylindrical storage cells that is passed by a coolant. The root ends of the cells are inserted into a mount so that the heat is dissipated over the lower face and a narrow lower portion of the shell surface.

In case of stack design with prismatic cells, the increased clamping pressure required for prismatic cells in stack direction may cause damage to the cooling elements designed as flat tubes or plates. In case of socket mount with prismatic cells, a gap-like space is present between the cells of a module. With prismatic cells, the gaps would have to be filled with additional material in order to prevent bending, hence destruction of cells and/or the socket during pressing the cell modules. Often the battery subassemblies, the cell module and the cooling device, cannot be separately manufactured or finished. That makes the manufacture of the batteries more complex, involving risks during functional checks, particularly if the tightness of the cooling device, for example, can only be checked with the battery completely mounted.

U.S. Pat. No. 6,858,344 describes a battery stack including a number of prismatic batteries displaced in a parallel and integral bundle. Each prismatic battery includes an group of electrode plates and an electrolyte accommodated in a prismatic battery casing. A metal plate is integrated with the side wall of the prismatic battery the metal plate arranged parallel to the electrode plate group. A heat transition region projecting above the prismatic battery casing is provided on at least one side of the metal plate. A heat exchanger is provided such that a heat exchanger surface of the heat exchanger is brought into contact with the heat transition region projecting above the prismatic battery casing of the prismatic battery. After then, the battery stack and the heat exchanger are fastened. The heat exchanger is fastened using two mounting plates, which also serve to hold the battery stack together. For that a couple of projections project from either of both lower ends of a prismatic cell. In the cell stack projections of one of the lower ends of the stacked cells are fixed with screws using a mounting plate. A second mounting plate fixes the projections of each other ends of the cells. As a result the prismatic cells are tightly fastened and joined together as a battery stack. At the same time, the mounting plates serve as carrier device for the heat exchanger.

In DE 10 2007 063 176 A1, a battery with a heat conducting plate for tempering the battery is described, wherein the heat conducting plate is provided with several single cells parallel and/or serial switched together that are connected heat conducting to the heat conducting plate which in the range of poles of the single cells is provided with recesses through which the poles of the single cells project. The heat conducting plate is provided with a number of recesses corresponding to the number of poles, or pole couples, whereby a filling opening for the electrolyte is integrated into at least one of the poles of each single cell.

In DE 10 2008 016 936 A1, an electrochemical energy storage unit is disclosed that comprises a plurality of flat cells. The plurality of flat cells are displaced one above the other in a stack with their flat sides essentially arranged parallel to each other. At least one metal cooling sheet is located between two adjacent flat cells that is bent off at least one side. Further, a heat sink is provided as cooler to which the at least one metal cooling sheet thermally contacts. The heat sink is provided with recesses. The heat sink includes flat tubes that are passed by a refrigerant or coolant, or another fluid, whereby the recesses are provided for accepting the pins of a plastic rail, which subsequently can be formed to rivet heads such that a form closure is created. The plastic rail is attached to the respective metal cooling sheet by clipping, gluing or overmolding. For increased stability the pins may be guided in reinforcing members.

SUMMARY OF THE INVENTION

The present invention must not only provide a battery unit that not only meets the requirements of the cells, cell modules and cell batteries on a homogeneous temperature distribution, but also have a particularly simple design that satisfies the demands on the installation space, technical flexibility, easy manufacture as well as assembly, hence cost. Also, the cooling device in its finished condition should be capable of being produced as a separate component, independently of the storage modules or other battery components.

The present invention solves the above identified problems with a battery unit for hybrid or electric vehicles comprising a cell module consisting of a plurality of storage cells, each accommodated in a prismatic cell casing with two large surfaces arranged parallel to each other and four narrow side surfaces, whereby the prismatic cell casings with their parallel arranged large surfaces are stacked above each other, one of the narrow side surfaces each forms the cell casing bottom of a storage cell, and the cell casing bottom of each storage cell is part, in each case, of the cell module bottom; a cooling device comprising a plate-shaped cooling body with one or several recesses, and one or several fastening mechanisms integrated into the cell module bottom that engage with a corresponding number of recesses of the cooling body, thereby fixing the cooling body to the cell module.

The broad concept is that prismatic storage cells create less heat losses than cylindrical storage cells and that also, the heat conductivity of the cell can be optimized in direction of the cell height by well-planned insertion of the electrodes/dielectric reels. Therefore it becomes possible to dissipate all or substantially all of the total heat losses of a storage cell solely over the bottom surface of the cell casing without the temperature course or dissipation path within the storage cell leading to inadmissibly high temperature distances. Based on these prerequisites the invention proposes a cooling device made of a plate-shaped cooling body mounted to the bottom side of a cell module. An essential advantage of the battery unit according to the invention is that the battery unit is designed to be space saving due to the plate-like structure of the cooling body with integral mounting device.

The invention enables the plate-shaped cooling body to be easily mounted to preassembled cell modules that preferably are preclamped already by a clamping device. Another advantage is that the battery unit according to the invention corresponds to a modular system where the main components are independent of the cell module and battery sizes and the cold-side circuiting as well.

In an advantageous exemplary embodiment of the battery unit according to the invention the fastening means are integrated with the cell module bottom in such a way that the cell casings are provided with at least one fastening mechanism integrated with the cell module bottom. Storage cell casings with fastening mechanism integrated with the cell module bottom reduce the number of parts and the complexity of assembly, thus costs with simultaneously increased process reliability during assembly and enhanced functional safety in operation. The fastening mechanism integrated with the storage cell casing can be half rivets as well as clips, ears, tabs or the like. The fastening means preferably correspond to such recesses in the plate-shaped cooling body that are established as through holes.

In an alternative exemplary embodiment of the invention the fastening mechanism is integrated with the cell module bottom in that the cell stack of the cell module is extended by at least one intermediate sheet metal displaced between two storage cells that has at least one fastening means projecting at the bottom side of the cell module. Preferably, this version is provided with flag-like fastening means flared at the end faces. Also possible is the use of half rivets as in the above mentioned exemplary embodiment. An advantage of the invention in all its exemplary embodiments is that the manufacture and assembly of the battery unit subassemblies, particularly the cell module and cooling device, can be completely separate and independent of each other. With the intermediate sheets provided, a cooling device can also be designed compatible to storage cells without integrated fastening mechanisms. If no cell module clamping is provided, preferably intermediate sheets with head-side edgings are used with each edging resting on the head side of a cell casing. Intermediate sheets with head-side edgings enable compatibility to unclamped cell modules. Here the illustrated head-side edgings serve as supports in tensional direction.

In another alternative exemplary embodiment, the fastening mechanism is integrated with the cell module bottom by a screw-like tensional members, similar to bicycle spokes with a screw head, at the first end and an external thread at the second end are passed through channels in a cell module frame or between the single storage cells to the cooling body. The cooling body according to this exemplary embodiment is provided with corresponding threaded holes as recesses, whereby the cell module frame or the head sides of the cell casings serve as supports for the screw heads of the screw-like tensional members.

In a preferred exemplary embodiment of the invention, in addition to the assembly device, the integration of a clamping device is provided for flat pressing the cooling body to the cell module. For the flat pressing of the cooling body to the cell module one or several clamping members are displaced at the bottom side of the cooling body. The clamping members have through holes corresponding to the fastening mechanism of the cell module, with the height and cross section of each clamping member, apart from its material properties, depending on the width and number of individual fastening mechanisms per storage cell, per intermediate sheet, or the number and width of optionally used tensional members.

The use of a mounting and clamping device ensures the thermal contact of each single storage cell to the plate-shaped cooling body through separate and multiple clamping points. Advantageously, fixing and clamping of the plate-shaped cooling body is easily and simultaneously performed using slide members that are captively premounted to the plate-shaped cooling body through guides. Another advantage of this exemplary embodiment is that the battery unit is insensitive to thermal expansions due to one-sided clamping and fixing of the plate-shaped cooling body to the storage cells.

A clamping member should preferably be not wider than one or two cell depths, and as long as the width of a storage cell. Alternatively, the clamping members can also be designed wider so that they can simultaneously fix, and press to the cooling body, several storage cells and a whole cell module. The clamping member is preferably provided with through holes corresponding to the fastening means at the storage cell, or the cell module, the through holes laterally changing to a T-slot. The clamping member can be placed flat on the cooling body through the through holes over the fastening mechanisms By sliding the clamping members to the side the heads of the fastening mechanisms come into the T-slot. The contact surface of the T-slot is preferably established inclined (as inclined plane). This causes that the clamping member and the fastening mechanism, or the storage cells or cell module, respectively, are pulled against each other. Alternatively, also the contact surface of an optionally present head of the fastening mechanism or both surfaces can be established inclined in form of an inclined plane. When the clamping member has reached its final position the cell casing bottom and the cooling body are pressed to each other so tight that their surfaces contact each other, which ensures continuous heat conduction.

Direct touch of the cell casing bottoms and the cooling bodies, however, is not always desired. Particularly in cooling systems where a refrigerant evaporates directly, hot starting can lead to a highly inhomogeneous temperature distribution. This is due to the fact that at a high temperature difference between refrigerant and battery cells the transferred heat flow increases highly disproportionately. The increased heat flow causes the refrigerant to evaporate completely after only a short path proportion of the total length of the heat exchanger. On this first path proportion high amounts of heat are removed from the corresponding storage cells so that they are heavily overcooled. On the second path proportion of the heat exchanger, the gaseous refrigerant can only take very little heat, and possibly during further flow due to the temperature compensation between storage cells and refrigerant, no heat at all. The corresponding storage cells situated on the second path proportion therefore will overheat heavily as compared to the storage cells on the first path. The early drying of the evaporator additionally leads to a disproportionately high pressure loss, which further intensifies the described effect. In order to limit the transferable heat flow from the storage cells into the evaporator, or the plate-shaped cooling body, respectively, in a preferred embodiment of the invention an additional intermediate layer is provided in the heat transmission path between the storage cells and the plate-shaped cooling body. This intermediate layer, for example, can consist of a heat conducting foil with suitably low heat conducting properties. Low heat conducting properties can be obtained by use of suitable materials, particularly plastic materials, and/or through the thickness of the layer or foil. Thick, flexible heat conducting layers/heat conducting mats further offer the advantage of compensated tolerances between storage cells and plate-shaped cooling body.

The heat transmission path from the storage cells to the plate-shaped cooling body includes at the contact point between the cell casing bottom and cooling body a contact resistance that has to be kept low. For that, it is usual to use the above mentioned heat conducting foils. The heat conducting foils, however, can only develop the desired properties if certain contact pressures exist. As has already been described, such contact pressures can be applied by clamping at the cell casing or at intermediate sheets, and by corresponding clamping members. If such clamping and fixing equipment cannot be used, alternative methods are needed.

The cooling body, as has already been described, is mounted to the bottom of the battery casing. The cooling body is not covered with a heat conducting foil but a gel cushion or a gel mat. Such a gel cushion, similar to a medical warming/cooling compress, comprises, for example, a plastic bag filled with a gel that is highly viscous over a wide temperature range, also at temperatures below zero. The thickness of such a cushion or such a mat, 1 to 10 mm or even more, is worth mentioning. Advantageously, the characteristics of the heat conducting path from the cell bottom to the plate-shaped cooling body can precisely be adjusted over the thickness of the gel mat. Due to the considerable thickness and flexibility of the gel mat even high tolerances can be compensated as they follow, for example, from the cell casing bottoms of a module not being flush in a plane as compared to plates that when not flush only transfer minimal heat. Another advantage of the gel mat is that clamping using clamping members between cell module and cooling body is not necessary or can be established relatively simple. In an advantageous exemplary embodiment of the invention the dead weight of the storage cells, or the cell modules, respectively, in connection with the highly flexible gel mat is sufficient to ensure uninterrupted heat conduction with appropriately low contact or transition resistance. The use of clamping members, however, is not excluded even if a gel mat is used. Alternatively, also the cover of a casing provided for the battery can apply forces to the cell modules from the top that provide for an adequate pressing, particularly when vibrations occur. In a particular embodiment of this alternative, the forces applied by the cover of the battery casing are introduced through compression springs so that homogeneous pressing is ensured and tolerances can be compensated.

Furthermore, for pressing of the intermediate layer the connecting method mentioned above is particularly suitable where the cell modules are screwed to the cooling body over tensional members. Such tensional members can, as has already been described, be simple screws or similar to bicycle spokes. Screws like bicycle spokes can be passed to the cooling body through narrow holes or channels, respectively, in a cell module frame additionally provided or between the single storage cells, whereby the base plate of the cooling body is provided with appropriate threaded holes. The supports for the screw heads are provided by the cell module frames or cell casings, optionally through washers or equivalent designs for applying the forces.

BRIEF DESCRIPTION OF THE DRAWINGS

Further details, features and advantages of the invention will become readily apparent after review of the following description of examples of embodiment, with reference to the associated drawings. The drawings show

DETAILED DESCRIPTION OF THE PREFERRED EMBODIMENT

Figure 1:
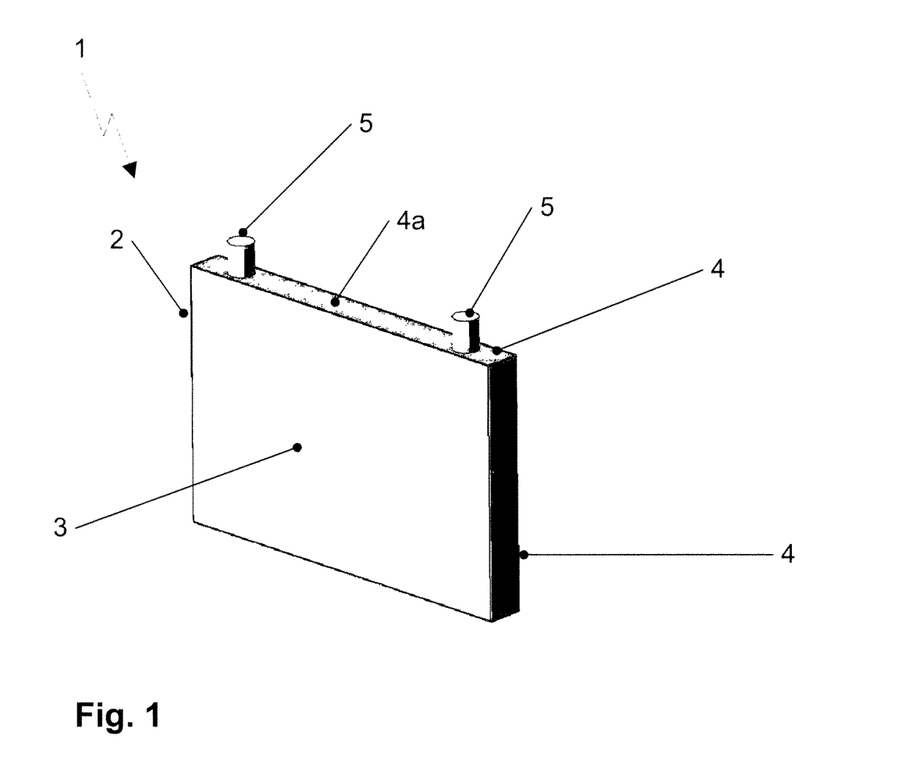
FIG. 1 is a perspective view of a prismatic storage cell of prior art.

In FIG. 1 a prismatic storage cell 1 of prior art is shown. A prismatic storage cell 1 is generally accommodated in a prismatic cell casing 2 with two large surfaces 3 arranged parallel to each other and four narrow side surfaces 4, which with their narrow length define the cell depth, or cell thickness. The two electrodes 5 of the storage cell 1 project from the side surface 4a, specifically the head surface 4a, to the top.

Figure 2:
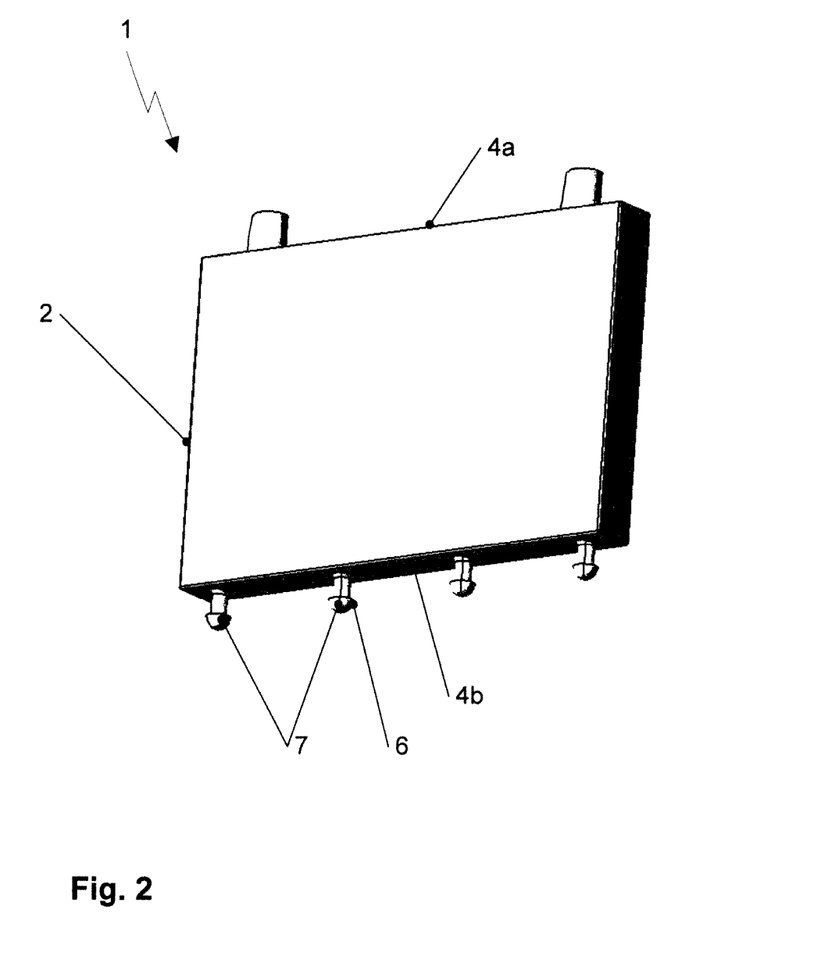
FIG. 2 is a perspective view of a prismatic storage cell with fastening mechanisms.

FIG. 2 shows a prismatic cell casing 2 of a storage cell 1 with integrated fastening mechanism 6 that is, for example, available in form of an extruded part made of aluminum. In this example, the prismatic cell casings 2 are provided with at least one bottom-side fastening mechanism 6 as a device for fastening a cooling body to the coolant casing, specifically a fastening mechanism 6 that is established at the narrow side surface 4b that forms the cell casing bottom 4b directed to the bottom, parallel opposite to the head surface 4a of the coolant casing. As illustrated in FIG. 2, as an exemplary fastening mechanism 6, four half rivets 7 are illustrated.

Figure 3:
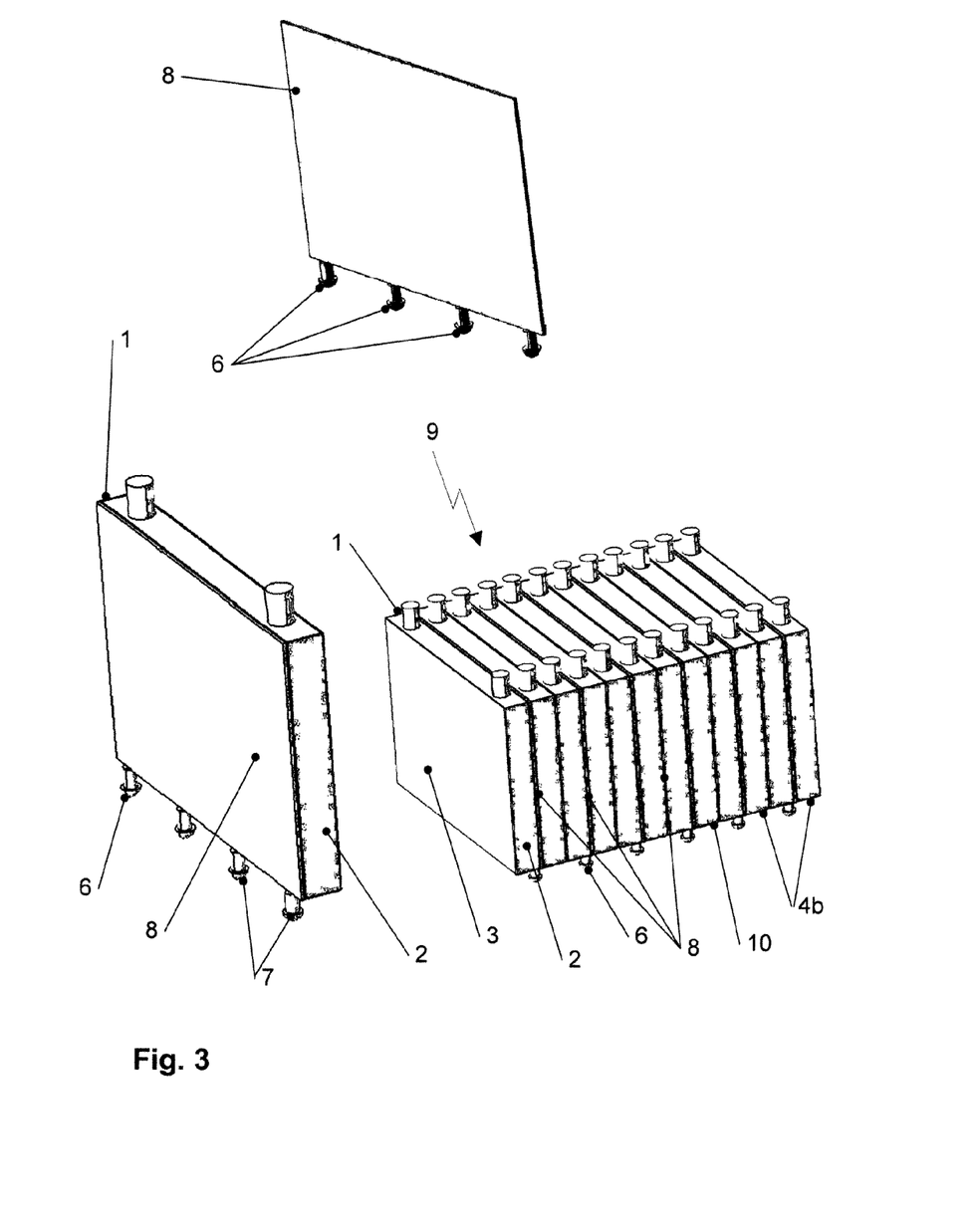
FIG. 3 is perspective exploded view of an intermediate sheet with fastening mechanism and the arrangement of several intermediate sheets in a cell module.

If suitable devices cannot be attached to the coolant casings, the cell stacks of a cell module 9, as shown in FIG. 3, are extended by at least one intermediate sheet 8 that has at least one fastening mechanism 6 projecting at the bottom side of the cell module 9. FIG. 3 shows such a cell module 9 in form of a cell stack where the prismatic cell casings 2 with their large surfaces 3 arranged parallel to each other are displaced one adjacent to the other in a stack. In addition, intermediate sheets 8 are inserted between the prismatic cell casings 2 so that in the cell stack of the prismatic cell casing 2 storage cells 1 and intermediate sheets 8 alternate arranged one next to the other. The cell casing bottoms 4b of the storage cell 1 in common with the bottom sides of the intermediate sheets 8 form the cell module bottom 10 from which the fastening mechanism 6 projects. As to the representation of FIG. 3, the fastening mechanism 6 corresponds to the contour of a half rivet 7.

Figure 4:
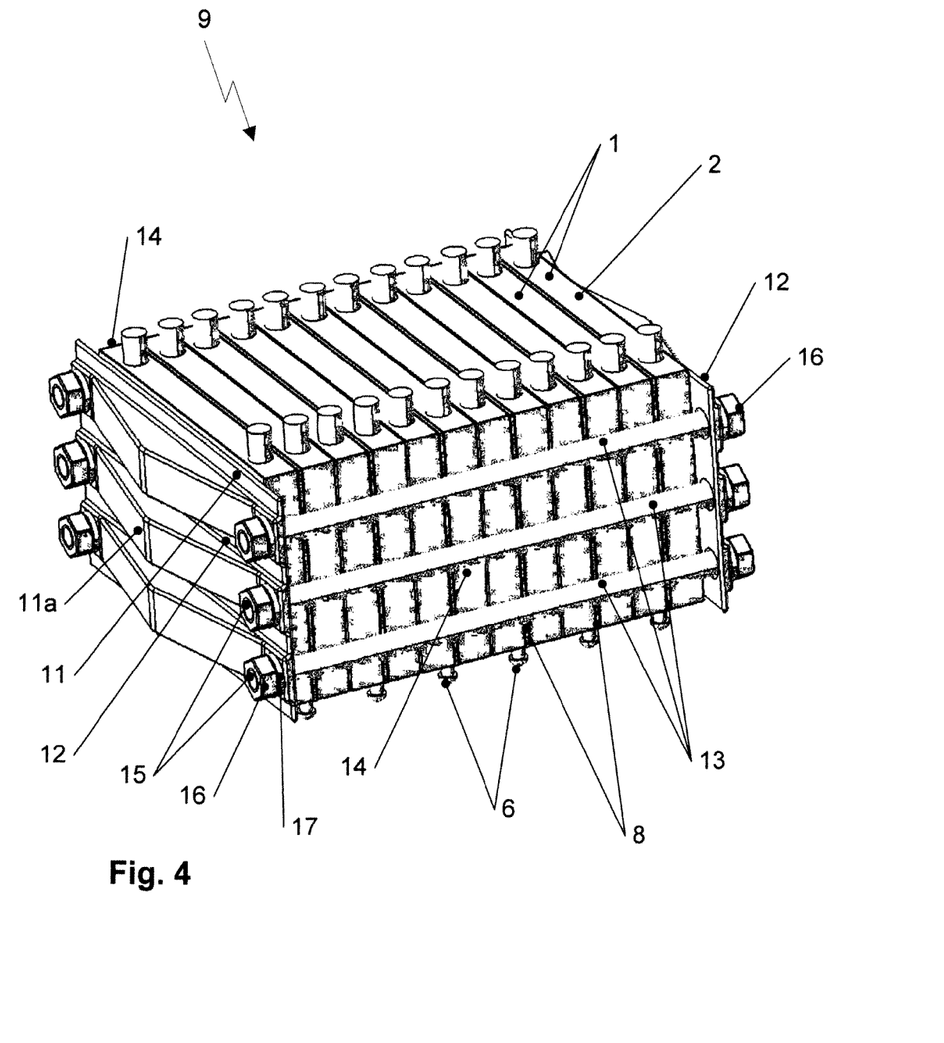
FIG. 4 is a perspective view of a clamped cell module.

FIG. 4 shows a clamped cell module 9. The cell module 9 comprises a plurality of storage cells 1 with the prismatic cell casings 2 having their large surfaces 3 are arranged one above the other in a stack or adjacent to one another in a stack, and intermediate sheets 8 inserted between the prismatic cell casings 2 of the storage cells 1. In this way the prismatic cell casings 2 and the intermediate sheets 8 form the cell module 9 in the form of a cell stack where the cell casings 2 of the storage cells 1 and the intermediate sheets 8 are alternate arranged one above the other or one adjacent to the other.

Figure 5:
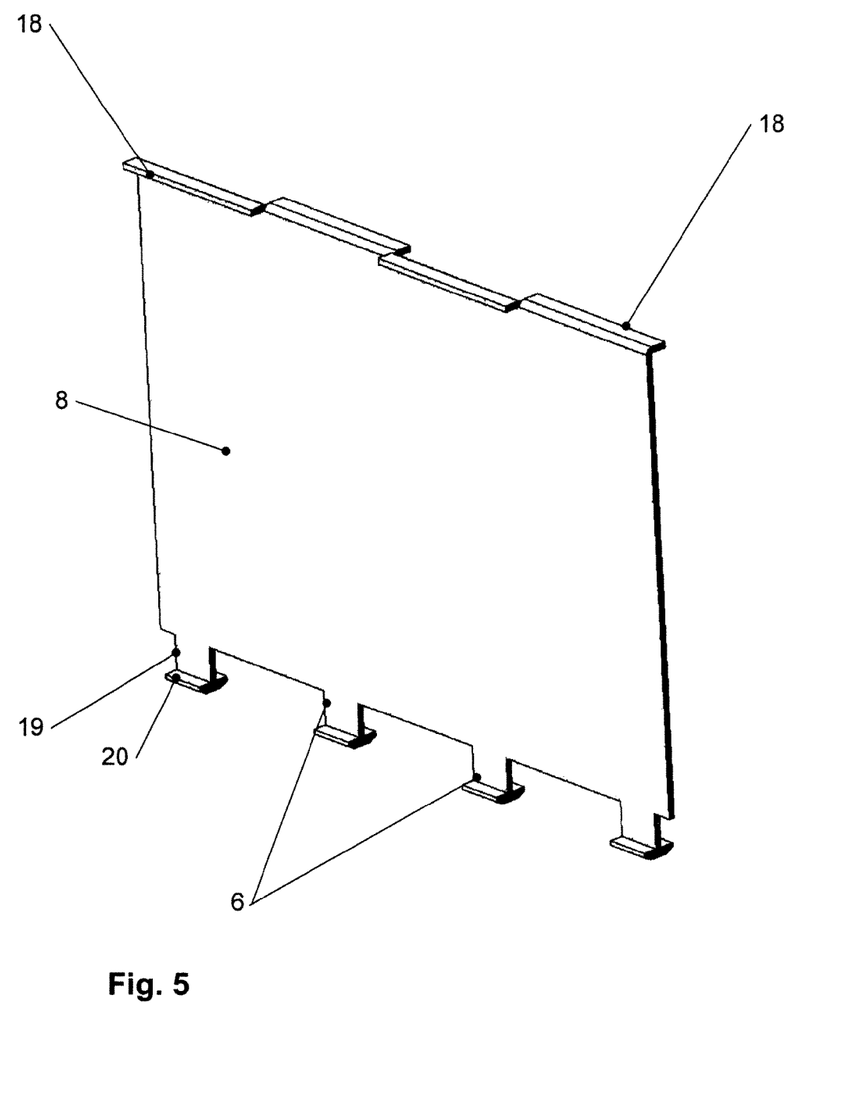
FIG. 5 is perspective view of an intermediate sheet with flag-like fastening mechanism and end-side flaring, and with head-side edgings.
Figure 6:
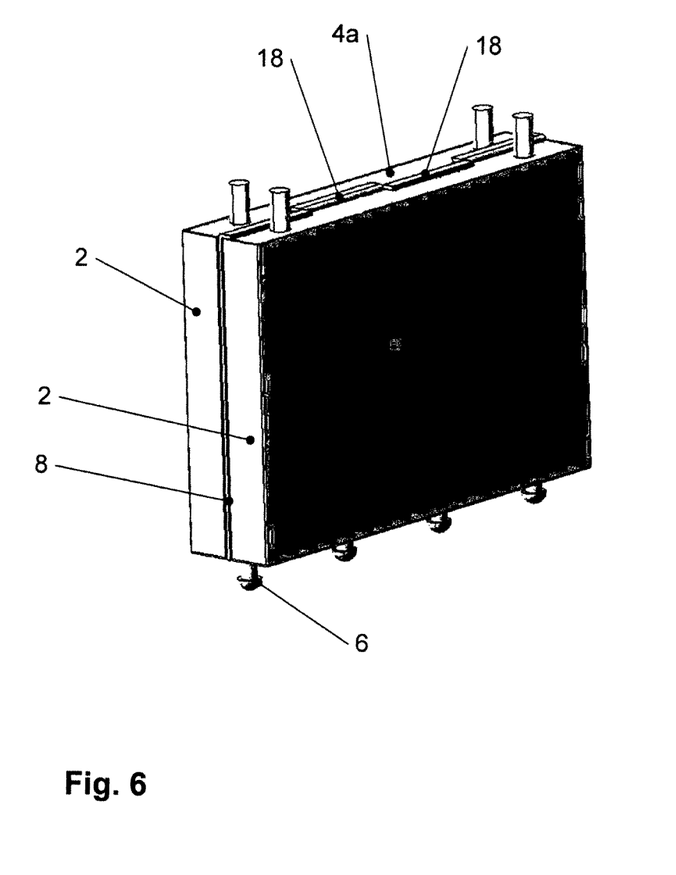
FIG. 6 is perspective view of an intermediate sheet with head-side edgings as supports in tensional direction for supporting the friction forces, or as variant for non-pressed cell modules.

The cell module 9 is clamped using a clamping device, including as exemplary illustrated in FIG. 4, two clamping plates 11 with three horizontally oriented, parallel distanced clamping bodies 11a each situated on the faces 12 of the cell module 1. The clamping plates 11 are designed wider than the large surfaces 3 of the cell casings 2 such that they project over the cell casings 2 on both sides in the horizontal direction as illustrated in FIG. 4. In the illustrated example in FIG. 4, the clamping bodies 11a of the clamping plates 11 located on the opposite faces 12 of the cell module 9 are connected to each other by totally six clamping shafts 13 that run on both sides (three clamping shafts at one side) parallel to both longitudinal sides 14 of the cell module 9. Both end regions 15 of the clamping shafts 13 are passed through holes in the clamping bodies 11a, whereby both end regions 15, as to the representation of FIG. 4, are established as external threads that correspond to the internal threads of hexagonal nuts 16 as the clamping member 16. By screwing of the end regions 15 of the clamping shafts 13 placed on both sides parallel to the longitudinal sides 14 of the cell module 9 to the clamping members 16 the process of cell module clamping is performed, with, as to FIG. 4, washers 17 placed between the clamping members 16 and the clamping bodies 11a. The intermediate sheets 8 are force-closed fixed after cell module clamping between the storage cells 1 so that the fastening mechanisms 6 are capable to take tensional forces in direction of the cell height. If no module clamping is provided, intermediate sheets 8 with head-side edgings 18, for example, are used instead as illustrated in FIG. 5. In a version of this alternative exemplary embodiment of the intermediate sheets 8, the fastening mechanisms 6 of the intermediate sheets 8 are provided in form of flag-like sheet stripes 19 with end-side flaring 20. As appropriate counter-support the mutually oriented edgings 18 of the intermediate sheets 8 are situated on the head surfaces 4a of the cell casings 2, as shown in FIG. 6. A intermediate sheet 8 with head-side edgings functions as support in tensional direction to support the friction forces, or as variant for unpressed cell modules, respectively.

Figure 7:
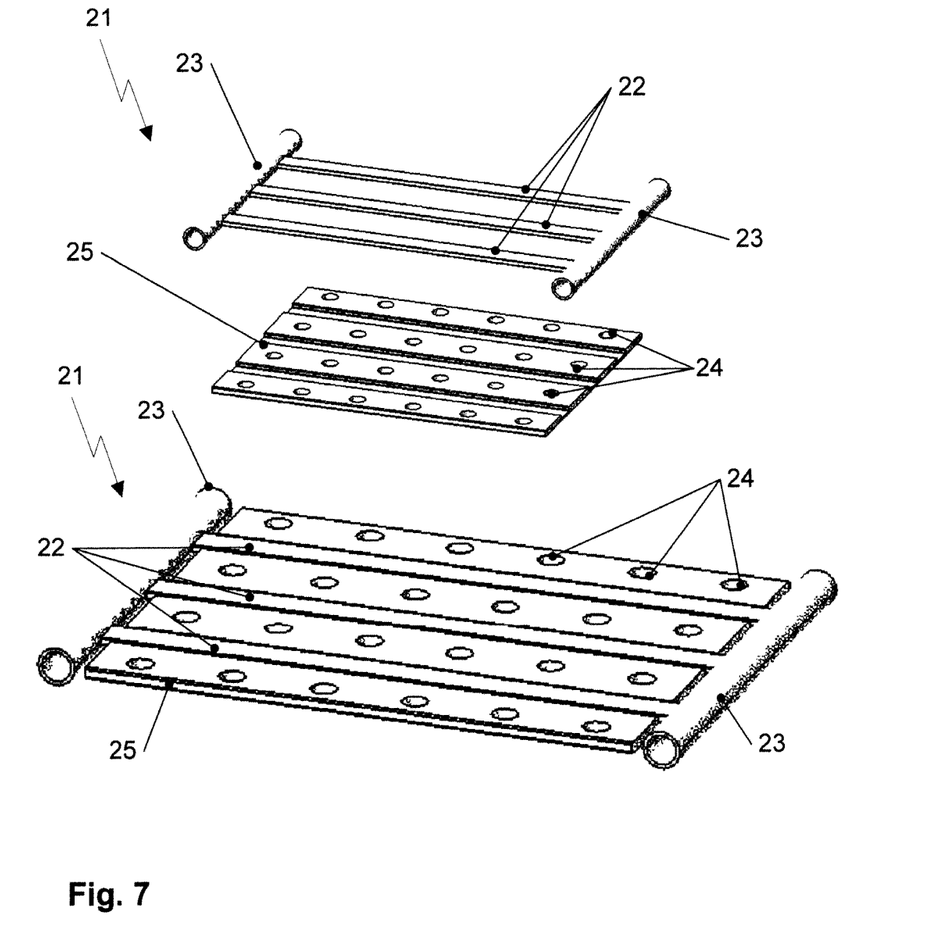
FIG. 7 is a perspective view of a cooling body and an exploded cooling body.

FIG. 7 shows the structure of a cooling body 21 for the battery unit. The cooling body 21, as to FIG. 7, can comprise a wide multi channel flat tube 22 with collecting tubes 23. Further, it has a plurality of through holes 24. At the points of the through holes 24 either no channels of the multi channel flat tube 22 exist or the respective channels are not connected to the collecting tubes 23. When the storage cells are very wide use of several narrow multi channel flat tubes 22 may be recommended to be held by a common base plate 25 that simplifies mounting but also can have heat-insulating properties.

A further configuration of the cooling body 21 is the design in form of plates such as known from plate heat exchangers. The plates do not comprise, however, two profiled half shells of sheet metal, but preferably comprise a profiled plate of sheet metal and a planar plate of sheet metal. For tightness reasons both plates are preferably brazed or welded to each other. The planar plate side is in thermal contact to the bottoms of the storage cells. Wide multi channel flat tubes 22 or plates do not exclude the use of a base plate 25, for example for stability or thermal reasons.

Figure 8:
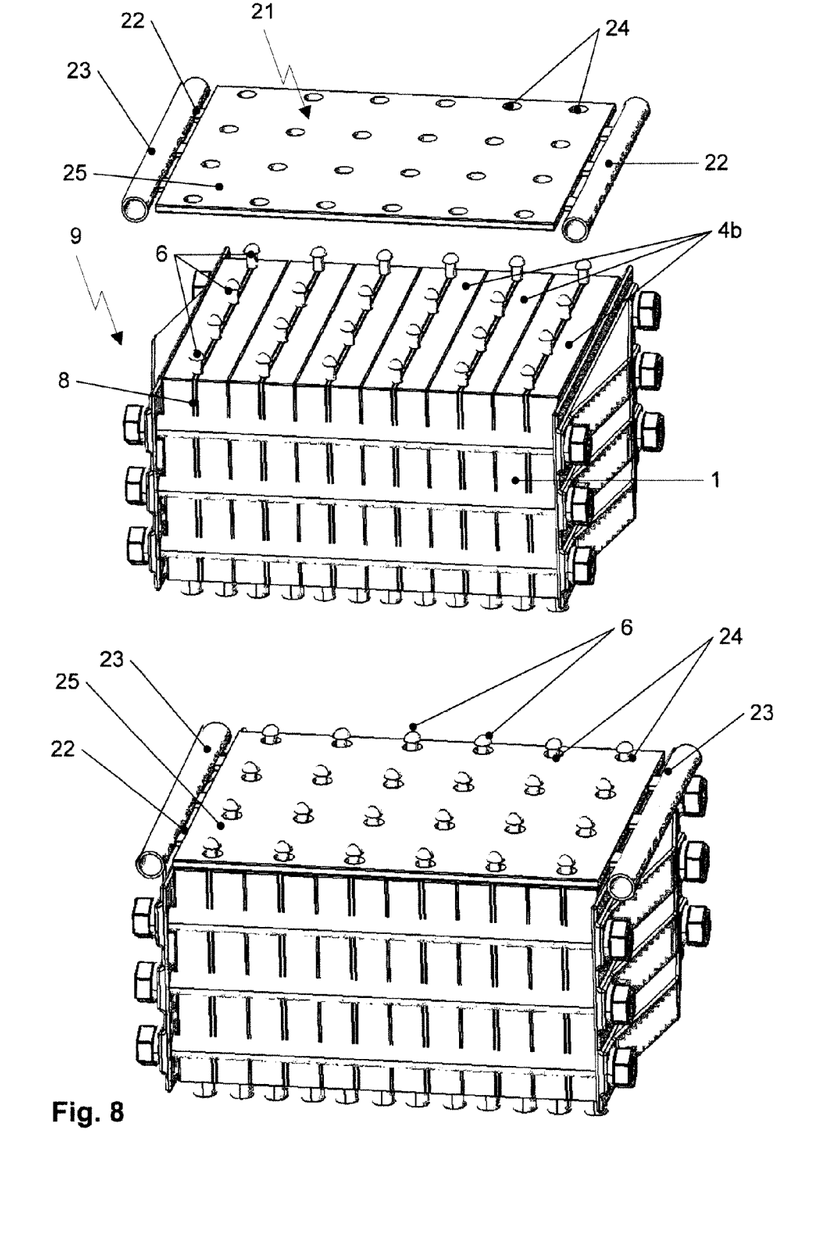
FIG. 8 illustrates a perspective view of a cooling body positioned to be assembled on the clamped cell module and the result of such assembly.

FIG. 8 represents the process of joining together a clamped cell module and a cooling body 21. The cooling body 21 is designed such that the main direction of the coolant flow crosses the storage cells 1 of a cell module 9, or is oriented in direction of the cell depth (cell thickness). The cooling body 21, as mentioned above, is provided with through holes 24 dependent on the type of fastening mechanism 6 (half rivets, as to FIG. 8) so that the cooling body 21 can be brought into contact with the cell casing bottom surfaces 4b of all cell casings 2 in order to effectively dissipate the heat loss developed in the storage cells 1.

Figure 9A:
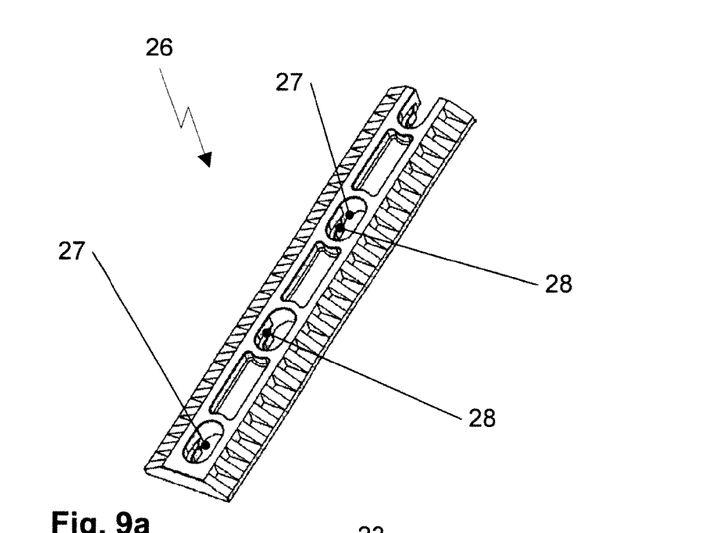
FIG. 9a is a perspective view of a clamping member.
Figure 9B:
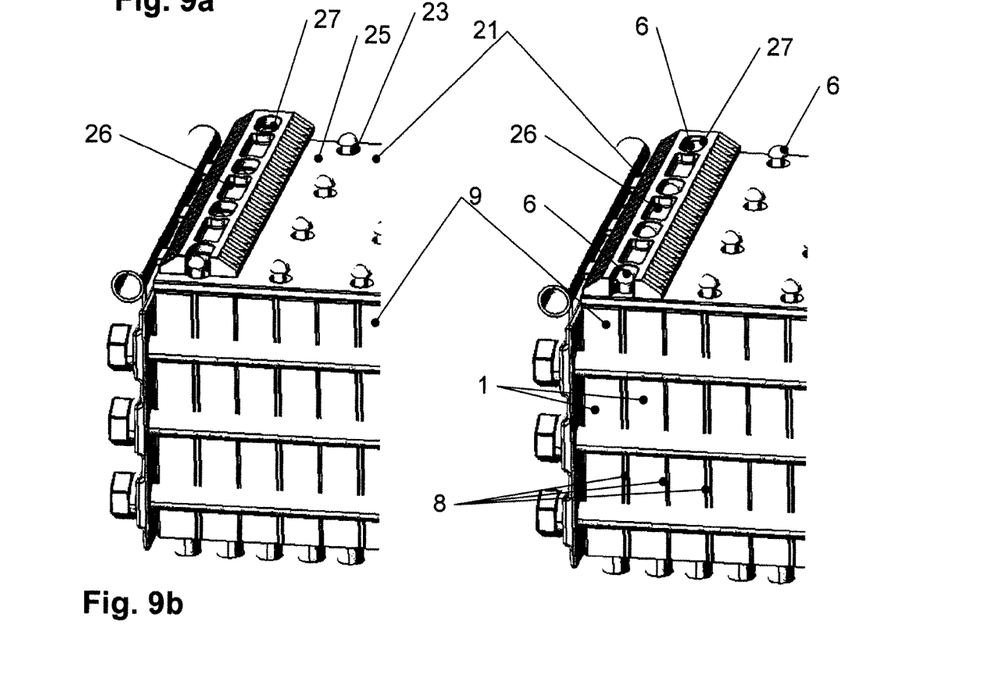
FIG. 9b illustrates a perspective view of a first clamping member positioned to clamp the cooling body to the cell module and the result of such clamping.

Specific clamping members 26, as to FIG. 9a and FIG. 9b, fix the cooling body 21 to the cell module 9, or press the cooling body 21 flatly to the cell casing bottoms 4b, respectively, for uninterruptible heat conduction, whereby FIG. 9a shows a single clamping member and, FIG. 9b the mounting of a cooling body 21 to a cell module 9 using the first clamping member 26. A clamping member 26, as to the exemplary embodiment shown in FIG. 9b, is typically not wider than two cell depths and about as long as the width of a storage cell 1. Alternatively, the clamping members 26 can also be established wider so that they can fix and press against the cooling body 21 several storage cells 1 or a whole cell module 9 at the same time (not illustrated). The height and cross-section of a clamping member 26, apart from its material properties, depend on the width and number of fastening mechanisms 6 per storage cell 1, or per intermediate sheet 8, respectively. The clamping member 26 is preferably provided with through holes 27 corresponding to the fastening mechanisms at the storage cell 1/cell module 9, the through holes 27 which as illustrated laterally change to a T-slot 28. The clamping member 26 can be placed flat on the cooling body 21, or the base plate 25 of the cooling body 21, through the through holes 27 over the fastening mechanism 6. By sliding the clamping members 26 to the side, the heads of the fastening mechanisms 6 come into the T-slot area 28. As the contact surface of the T-slot 28 is established as an inclined area (as inclined plane) (alternatively, also the contact surface of the head of the fastening mechanism 6, or both surfaces), the clamping member 26 and the fastening means 6, or the storage cells 1 or cell module 9, respectively, are pulled against each other. When the clamping member 6 has reached its final position, the cell casing bottom (not shown in FIG. 9b, see FIG. 8) and the cooling body 21 are pressed to each other so tight that their surfaces sufficiently contact each to ensure continuous heat conduction. In another embodiment, which is not illustrated, easy and simultaneous fixing and clamping of the plate-shaped cooling body is performed using slide members that are captively premounted to the plate-shaped cooling body through guides. The guides are integrated at the lower side of the base plate 25, the corresponding counterparts are provided at the clamping members 26.

Figure 10:
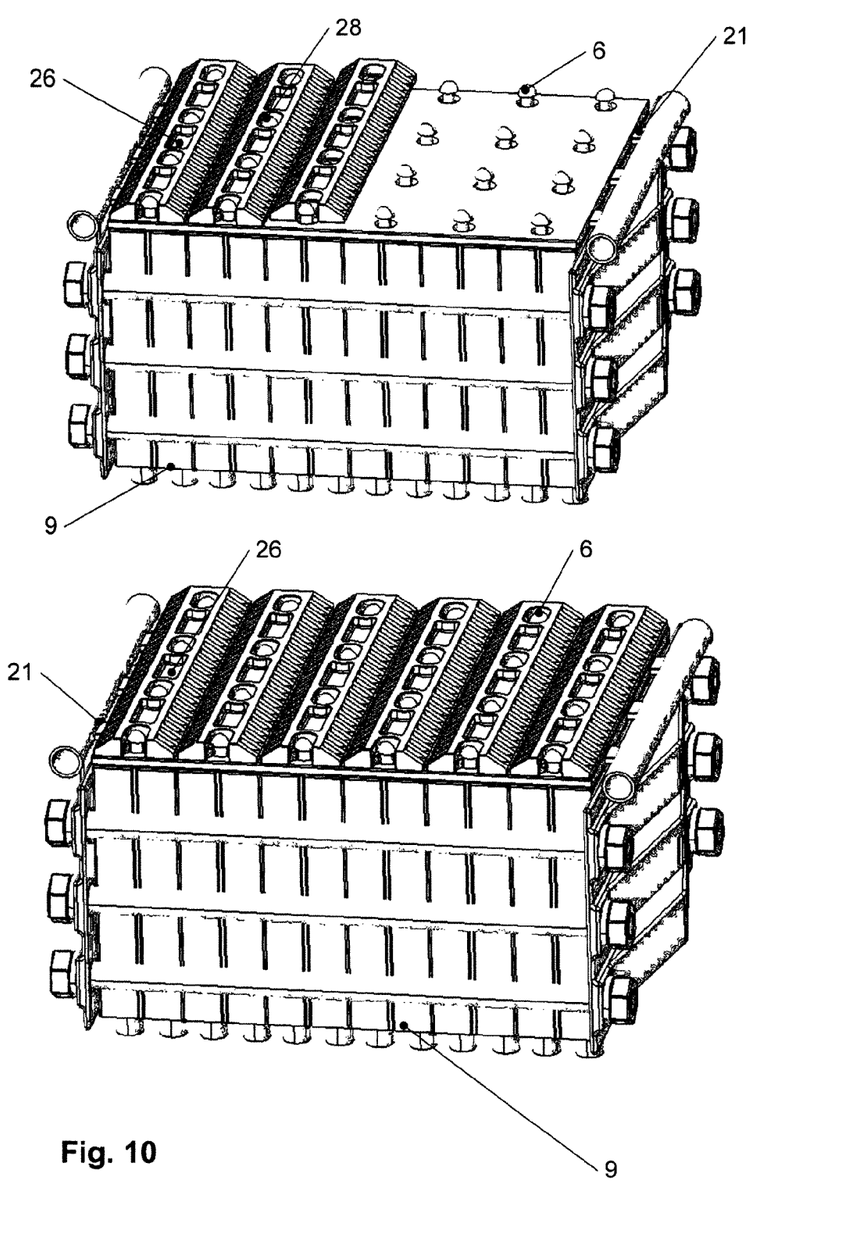
FIG. 10 illustrates a cooling body partially clamped to the cell module and a fully clamped cooling body.

FIG. 10 shows further mounting of the cooling body 21 to the cell module 9 using six clamping members 26. If the clamping members 26 are made of plastics and relaxation is expected due to the necessary surface pressure between the fastening mechanisms 6 and the clamping members 26, the clamping members 26 in the region of the T-slots 28 may be provided with metallic backing plates or spring members. Additionally or alternatively, the clamping members 26 in the region of the T-slots 28 may be provided with metallic cores or inserts. In another embodiment not shown, the clamping members 26 are captively premounted to the base plate 25 over T-slots, such as dovetail guides or the like.

Figure 11:
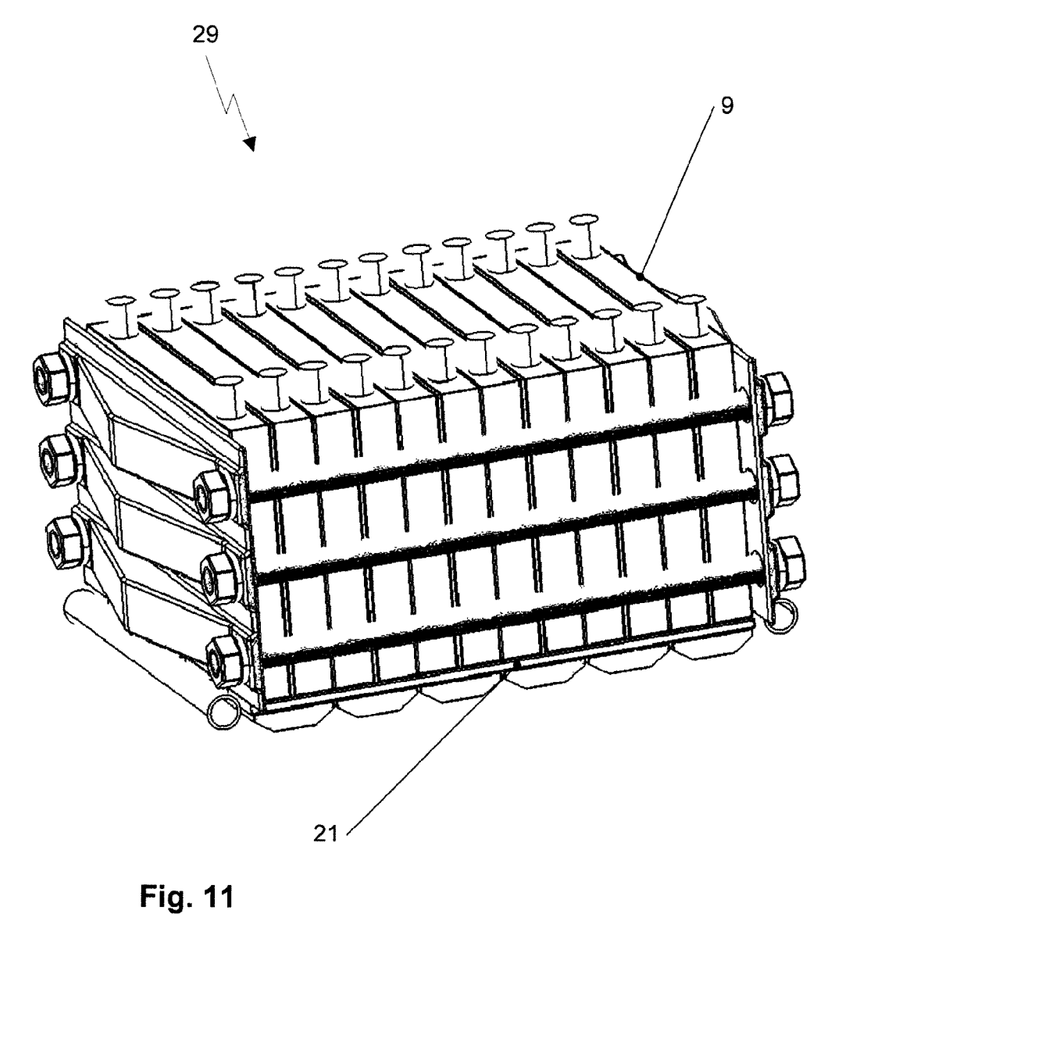
FIG. 11 is a perspective view of an assembled battery unit.

Finally, FIG. 11 shows a completely assembled battery unit 29 for hybrid or electric vehicles, comprising a cell module 9 and a cooling device 21.

What is claimed is:

1. A battery unit for hybrid or electric vehicles, comprising:
a cell module, comprising a plurality of storage cells that each include a prismatic cell casing with two large surfaces arranged parallel to each other and four narrow side surfaces, each of the four narrow side surfaces being narrower than the two large surfaces, whereby
the prismatic cell casings with their parallel arranged large surfaces are stacked adjacent to each other,
one of the narrow side surfaces, in each case, of the prismatic cell casing forms the cell casing bottom of a storage cell, and
the cell casing bottom of each storage cell, in each case, is part of the cell module bottom;
a cooling device comprising a plate-shaped cooling body with a plurality of recess, and
at least one fastening mechanism for each of the plurality of storage cells integrated into the cell module bottom to correspond with the at least one recess of the cooling body thereby fixing the cooling body to the cell module.

2. The battery unit of claim 1 wherein the plurality of fastening mechanisms are is integrated into the cell module bottom of the cell casings at the bottom side.

3. The battery unit of claim 1 wherein the cell stack of the cell module is extended by at least one intermediate sheet and wherein said plurality of fastening mechanisms are is integrated into the cell module bottom to project at the bottom side of each of said at least one intermediate sheet.

4. The battery unit of claim 3 wherein flag-like sheet stripes are provided as the fastening mechanisms.

5. The battery unit of claim 1 wherein the fastening mechanisms is approximately contoured as a half rivets configured to pass through at least one hole in the cooling body each of which is configured to be said plurality of recesses.

6. The battery unit of claim 1 wherein said plurality of fastening mechanisms are integrated into the cell module bottom in that screw-like tensional members with a screw head at the first end and an external thread at the second end are passed to the cooling body through channels in a cell module frame or between the single storage cells, whereby the cooling body is provided with corresponding threaded holes as recesses, whereby the cell module frame or the head sides of the cell casings serve as supports for the screw heads of the screw-like tensional members.

7. The battery unit of claim 1 wherein at least one clamping member is provided for flat pressing the cooling body to the cell module bottom, whereby said at least one clamping member is provided with through holes that correspond to the fastening mechanism and the height and cross section of said at least one clamping member depends on the width and number of fastening mechanisms per storage cell or per an intermediate sheet or on a number and width of used tensional members.

8. The battery unit of claim 7 wherein said at least one clamping member is not wider than one or two cell depths and is as long as the width of a storage cell.

9. The battery unit of claim 1 wherein an intermediate layer with heat conduction properties is provided between cell module bottom and cooling body.

10. The battery unit of claim 9 wherein said intermediate layer is selected from one of a heat conducting foil or a gel cushion.

* * * * *